United States Patent
Davis

[11] Patent Number: 6,082,508
[45] Date of Patent: Jul. 4, 2000

[54] PNEUMATIC DAMPING STRUT

[75] Inventor: Lawrence P. Davis, Pheonix, Ariz.

[73] Assignee: Honeywell International Inc., Morristown, N.J.

[21] Appl. No.: 08/842,283

[22] Filed: Apr. 23, 1997

[51] Int. Cl.⁷ .................................................... F16F 9/04
[52] U.S. Cl. ........................................ 188/298; 267/64.19
[58] Field of Search .................................. 188/298, 301, 188/378, 379; 267/64.19, 64.23, 64.26, 64.27, 64.28, 150, 122, 127

[56] References Cited

U.S. PATENT DOCUMENTS

| | | | |
|---|---|---|---|
| 1,821,988 | 9/1931 | Rowles | 188/298 X |
| 2,317,028 | 4/1943 | Chappell et al. | 188/298 X |
| 3,101,937 | 8/1963 | Stearns | 267/122 |
| 3,752,270 | 8/1973 | Valdespino | 188/298 |
| 3,915,421 | 10/1975 | Le Forestier | 267/64.27 |
| 4,572,488 | 2/1986 | Homberg, Jr. et al. | |
| 4,572,649 | 2/1986 | Homberg, Jr. et al. | 267/64.27 |
| 4,760,996 | 8/1988 | Davis | 267/122 |
| 4,848,525 | 7/1989 | Jacot et al. | 188/378 |
| 4,872,649 | 10/1989 | Kawamata | 188/298 |
| 5,024,302 | 6/1991 | Karnopp | 267/127 |
| 5,219,051 | 6/1993 | Davis | 188/378 |
| 5,249,783 | 10/1993 | Davis | 267/217 |
| 5,305,981 | 4/1994 | Cunningham et al. | 248/550 |
| 5,318,156 | 6/1994 | Davis | 188/298 |
| 5,332,070 | 7/1994 | Davis et al. | 188/298 |
| 5,366,048 | 11/1994 | Watanabe et al. | 188/298 X |
| 5,489,009 | 2/1996 | Kawamata et al. | 188/298 X |
| 5,775,472 | 7/1998 | Osterberg et al. | 267/122 |

FOREIGN PATENT DOCUMENTS

| | | |
|---|---|---|
| 537348 | 4/1955 | Belgium . |
| 0414508 | 2/1991 | European Pat. Off. . |
| 643711 | 9/1928 | France . |

OTHER PUBLICATIONS

Article by Porter Davis, David Cunningham and John Harrell entitled "Advanced 1.5 Hz Passive Viscous Isolation System" presented at the 35th AIAA Conference in Apr. 1994.

*Primary Examiner*—Matthew C. Graham
*Assistant Examiner*—Melanie Talavera
*Attorney, Agent, or Firm*—Charles J. Ungemach

[57] ABSTRACT

A vibration isolator which uses a compressible fluid such as air within a pair of flexible chambers interconnected by a restrictive passage, with one of the chambers connected between a first member which may vibrate and a second member which is to be isolated from vibration so that with vibration of the first member, the compressible fluid is compressed and expanded to force compressible fluid to flow through the restrictive passage between the first and second flexible chambers, and provide desired damping of vibration to the second member.

10 Claims, 1 Drawing Sheet

PNEUMATIC DAMPING STRUT

BACKGROUND OF INVENTION

1. Field of the Invention

The present invention relates to dampers and more particularly to a damping strut or vibration isolator which utilizes a compressible fluid such as air to provide pneumatic damping.

2. Description of the Prior Art

Dampers are well known in the art. Prior art dampers utilize a non-compressible fluid in a sealed container connected to a first member and forming a chamber on either side of a piston connected to a second member. A passage around or through the piston permits a predetermined flow path for the non-compressible fluid as forces cause the piston to vibrate or move in the container. A flexible chamber such as a bellows is connected to the chamber to permit fluid expansion and contraction as the temperature changes. By proper choice of the non-compressible fluid and the size of the passage around the piston, a desired resistance to motion of one of the members is provided thus damping transfer of such motions to the other member. Alternately, the container may be formed by flexible chambers on either side of the apertured piston to provide the desired damping between the members.

One disadvantage of the prior art dampers is the requirement for a fluid expansion chamber to accommodate volume changes due to temperature variations. The added size and weight are undesirable particularly in space applications where size and weight limitations are severe. Another disadvantage of the prior art dampers is that the viscosity of the non-compressible fluid changes significantly with temperature changes and such changes in viscosity alter the damping characteristics.

BRIEF DESCRIPTION OF THE INVENTION

The present invention utilizes a compressible fluid such as air or nitrogen in place of the non-compressible fluid of the prior art thus eliminating the need for a thermal expansion chamber since temperature changes produce only small pressure changes in the fluid. Furthermore, the changes in viscosity with temperature are much less with compressible fluids than with non-compressible fluids and so the damping characteristics vary far less with temperature. Furthermore, with a compressible fluid, the damping may be made desirably non-linear, i.e. being greater at low frequencies and lesser at high frequencies.

DETAILED DESCRIPTION OF THE PREFERRED EMBODIMENTS

Figure 1:
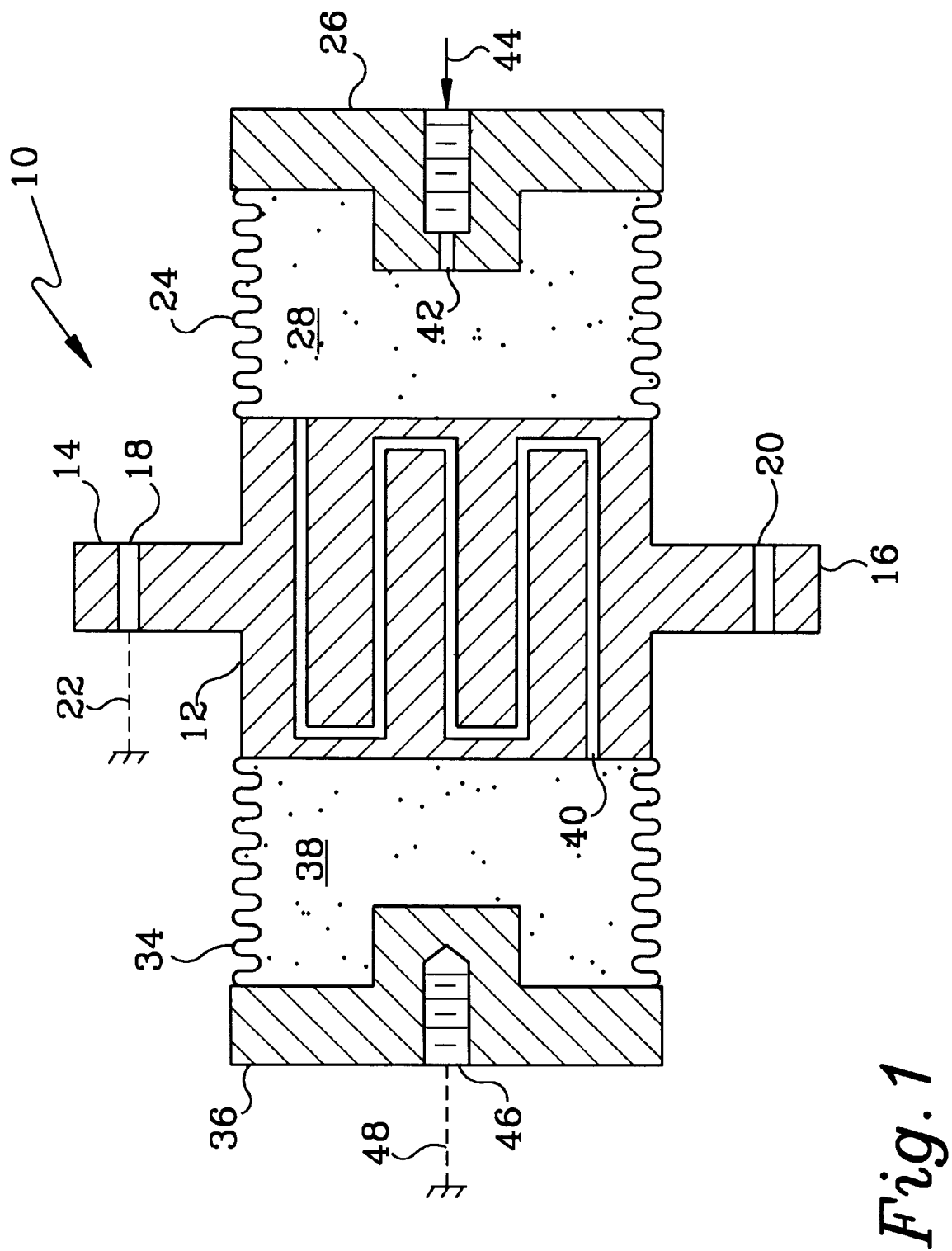
FIG. 1 is a cross-sectional view of a damper of the present invention.

In FIG. 1, a damper 10 is shown comprising a piston member 12 including mounting flanges 14 and 16 with apertures 18 and 20 therethrough for mounting the piston to a first member shown by a dashed line 22.

A first bellows 24 is shown having a first end connected to the right side of piston member 12 and a second end connected to a first end piece 26 to form a first chamber 28. A second bellows 34 is shown having a first end connected to the left side of piston member 12 and a second end connected to a second end piece 36 to form a second chamber 38.

A circuitous fluid path 40 is shown passing through piston member 12 so as to provide restricted fluid flow between chambers 28 and 38. End piece 26 has a port 42 therethrough for use in filling chambers 28 and 38 with a compressible fluid as shown by arrow 44. End piece 36 has a screw threaded portion 46 for use in attaching the damper 10 to a second member shown by dashed line 48. After filling with compressible fluid, port 42 is sealed and the fluid is trapped in chambers 28 and 38. Thereafter, if, for example, the second member represented by dashed line 48 vibrates, second end piece 36 will tend to move in the same direction to compress and expand the size of fluid chamber 38 against the resistance of the compressible fluid being forced through the restricted passage 40. This causes chamber 28 to expand and compress in the opposite sense to that of chamber 38 and the motion of member 48 will therefore not be wholly transferred to piston 12 and member 22 because of the expansion and contraction in chambers 28 and 38. This damping can be changed by varying the cross-sectional area and/or the length of the circuitous passage 40 to provide the desired damping effect. At very low frequency applications, the spring force of bellows 24 and 34 may add some stiffness to the system but at higher frequencies, the bellows 24 and 34 spring force may be ignored. If desired, a separate spring, not shown, may also be placed across the system to establish a desired static stiffness. At very high frequencies the stiffness of the compressible fluid may also have some effect.

It will be noted that the stiffness of the compressed gas is also affected by the length of the stroke produced by the vibration of member 48. For small strokes, the gas pressure is low and the stiffness is low. For large strokes, typified by resonance or high load environment such as during the launching of the satellite, the pressures and stiffness rise and limit the stroke thus increasing the damping force. This feature enables the system to have two operating regions such as is required with satellites. First, when the satellite is launched into space and load suppression is needed and second when the satellite is in orbit and it may be needed to suppress very small vibrations. Thus it is seen that by using a compressible fluid, a dual isolator function is obtained and performance at both ends of the vibration scale is improved.

Advantages obtained with the present invention include 1) the lowering of volumetric stiffness i.e. the stiffness of the system with the passage 40 plugged; 2) the dynamic mass effects of the prior art liquid are significantly reduced since the density and mass of the gas of the present invention is very low; 3) the use of gas reduces the overall weight of the system by approximately 10%; 4) if a leak occurs, there will be less contamination problem since gas is less of a contaminant than is liquid; 5) small leaks can easily be replaced by a suitable reservoir; 6) performance, specifically the non-linear effect (very useful, for example, in cases where isolation is needed for small motion and stroke limitation and high damping is needed for large motion) can be adjusted by changing the ratio of gas pressure-to-stroke; and, 7) the pressure regulator bellows is eliminated since temperature changes produce only minor pressure changes.

An explanation of isolation theory for 2 and 3 parameter system and volumetric compression may be found in an article entitled "Advanced 1.5 Hz Passive Viscous Isolation System" by Porter Davis, David Cunningham and John Harrel, presented at the 35th AIAA SDM Conference in April 1994.

Many changes will occur to those having skill in the art. For example, while air or nitrogen has been used, other gasses could also be employed. While the second end member 36 was described in the example as connected to the vibrating member, the piston could be connected to the vibrating member to isolate vibrations transferred to the end member. Furthermore, the circuitous passage could be of different length or of greater or lesser cross-section.

What is claimed is:

1. A vibration isolator for use between a first member which may vibrate and a second member to be isolated, comprising:

a first structure (means) connected to one of the first and second members;

a second structure (means) connected to the other of the first and second members;

a third structure (means);

first flexible means connected between the first and second structures (means) to form a first chamber;

second flexible means connected between the second and third structures (means) to form a second chamber, said first and second chambers being filled with a compressible fluid, the first, second and third structures (means) each being relatively movable with respect to each other; and, a restrictive passage between said first and second chambers to permit flow of the compressible fluid between the first and second chambers.

2. The vibration isolator of claim 1 further including a port for filling the first and second chambers with the compressible fluid.

3. The vibration isolator of claim 1 wherein the port is in the third structure.

4. The vibration isolator of claim 1 wherein the restrictive passage is of a length chosen to provide a desired amount of restricted flow of fluid between the first and second chambers.

5. The vibration isolator of claim 4 wherein the restrictive passage is circuitous through the second structure.

6. The vibration isolator of claim 1 wherein the compressible fluid is air.

7. The vibration isolator of claim 1 wherein the compressible fluid is nitrogen.

8. The method of isolating the vibrations of a first member from a second member comprising the steps of:

A. connecting a first expandable chamber between the first and second members;

B. connecting a second expandable chamber between one of the first and second members and a third member so that the first, second and third members each being relatively movable with respect to each other;

C. connecting a restrictive passage between the first and second expandable chambers; and, D. filling the first and second expandable chambers with a compressible fluid.

9. The method of claim 8 further including the step of:

C1. making the restrictive passage a circuitous path between the first and second chamber of length chosen to provide the desired restriction.

10. The method of claim 9 wherein the restrictive passage is through the one of the first and second member to which the second expandable chamber is connected.

* * * * *